(12) United States Patent
Rudolf

(10) Patent No.: US 7,114,688 B2
(45) Date of Patent: Oct. 3, 2006

(54) SUPPORT DEVICE FOR A LIQUID CRYSTAL FLAT SCREEN

(75) Inventor: Alain Rudolf, Saint Maur des Fosses (FR)

(73) Assignee: ID-Industrie + Design, Paris (FR)

( * ) Notice: Subject to any disclaimer, the term of this patent is extended or adjusted under 35 U.S.C. 154(b) by 0 days.

(21) Appl. No.: 10/469,230

(22) PCT Filed: Mar. 12, 2002

(86) PCT No.: PCT/FR02/00877

§ 371 (c)(1), (2), (4) Date: Sep. 5, 2003

(87) PCT Pub. No.: WO02/073047

PCT Pub. Date: Sep. 19, 2002

(65) Prior Publication Data

US 2004/0079849 A1    Apr. 29, 2004

(30) Foreign Application Priority Data

Mar. 12, 2001  (FR) .................................. 01 03327

(51) Int. Cl.
*E04G 3/00* (2006.01)

(52) U.S. Cl. .................... 248/278.1; 248/917; 248/919; 248/923; 403/122

(58) Field of Classification Search ............. 248/278.1, 248/918, 919, 920, 921, 922, 923, 924, 371, 248/181.1, 288.31, 917; 403/119, 122, 123
See application file for complete search history.

(56) References Cited

U.S. PATENT DOCUMENTS

| | | | |
|---|---|---|---|
| 4,066,231 A | * | 1/1978 | Bahner et al. ............... 248/552 |
| 4,988,065 A | * | 1/1991 | Leban et al. ............. 248/181.1 |
| 5,092,552 A | | 3/1992 | Dayton et al. |
| 6,406,407 B1 | * | 6/2002 | Wiedmann et al. ........... 482/82 |
| 2003/0042385 A1 | * | 3/2003 | Hung et al. ................. 248/371 |

FOREIGN PATENT DOCUMENTS

| | | |
|---|---|---|
| DE | 2840314 | 3/1980 |
| EP | 795716 | 9/1997 |
| FR | 2273189 | 12/1975 |
| FR | 2548746 | 1/1985 |

* cited by examiner

*Primary Examiner*—Amy J. Sterling
(74) *Attorney, Agent, or Firm*—Dennison, Schultz & MacDonald

(57) ABSTRACT

Support device for a liquid crystal flat screen (12), in particular for computer workstations, of the type including an arm (14) and an articulating mechanism (18) interposed between the arm and the screen. The articulating mechanism (18) includes a ball (36) having a general hemispherical shape (38) and adapted to be fixed to the screen (12), a cage (46) defining a housing (48) for receiving the ball and having an annular edge (50) which makes frictional contact with the ball, a tie rod (64) interposed between the cage (46) and the ball (36), while resting substantially at the center (C) of the ball, to exert an elastic restoring force of a selected value which causes the ball to rest against the annular edge of the cage, and a tie rod passage (74) formed of a widened recess produced in the ball (36) and opening on the hemispherical surface (38) of the ball to allow clearance of the tie rod in the ball, whatever the position of the ball with respect to the cage.

9 Claims, 4 Drawing Sheets

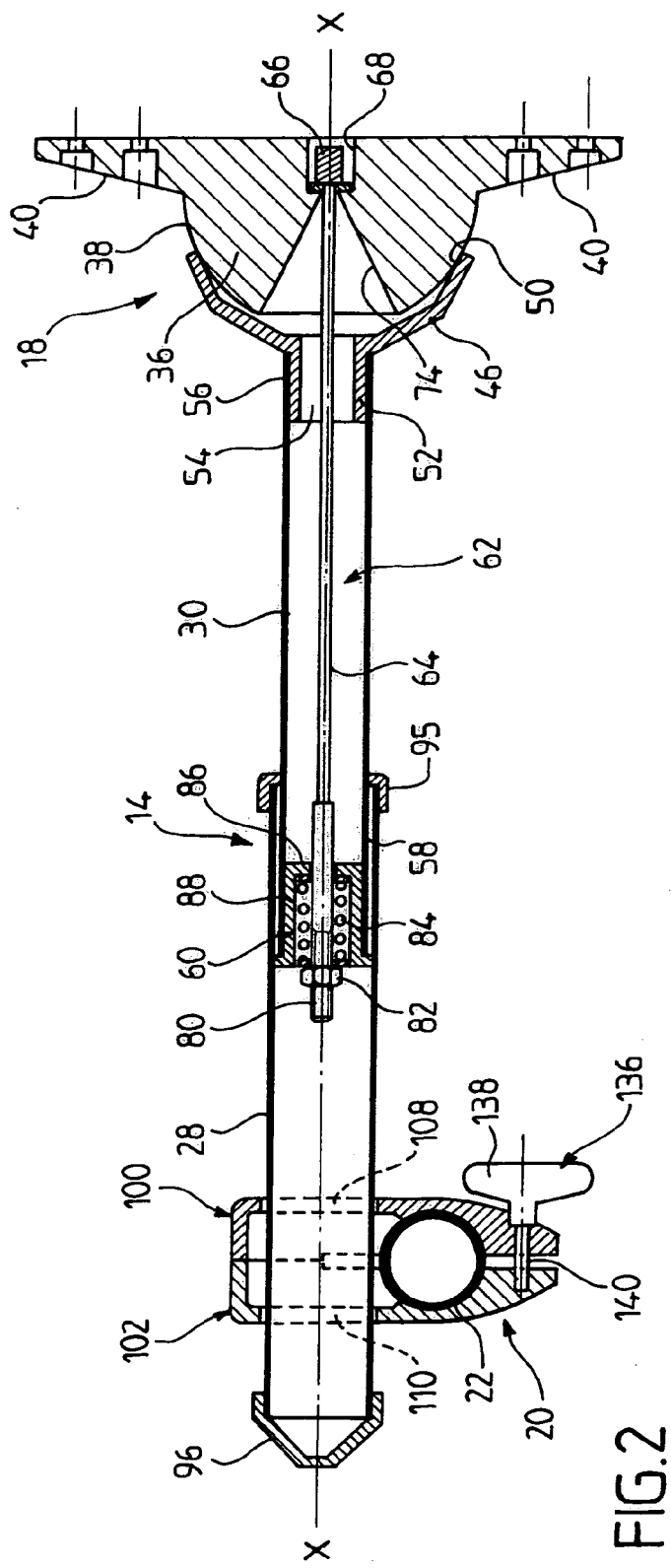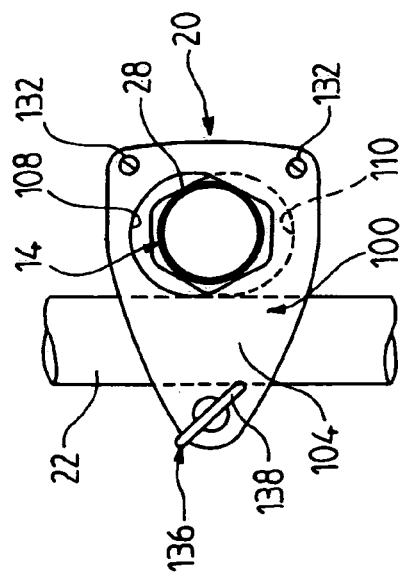
FIG. 2
FIG. 3

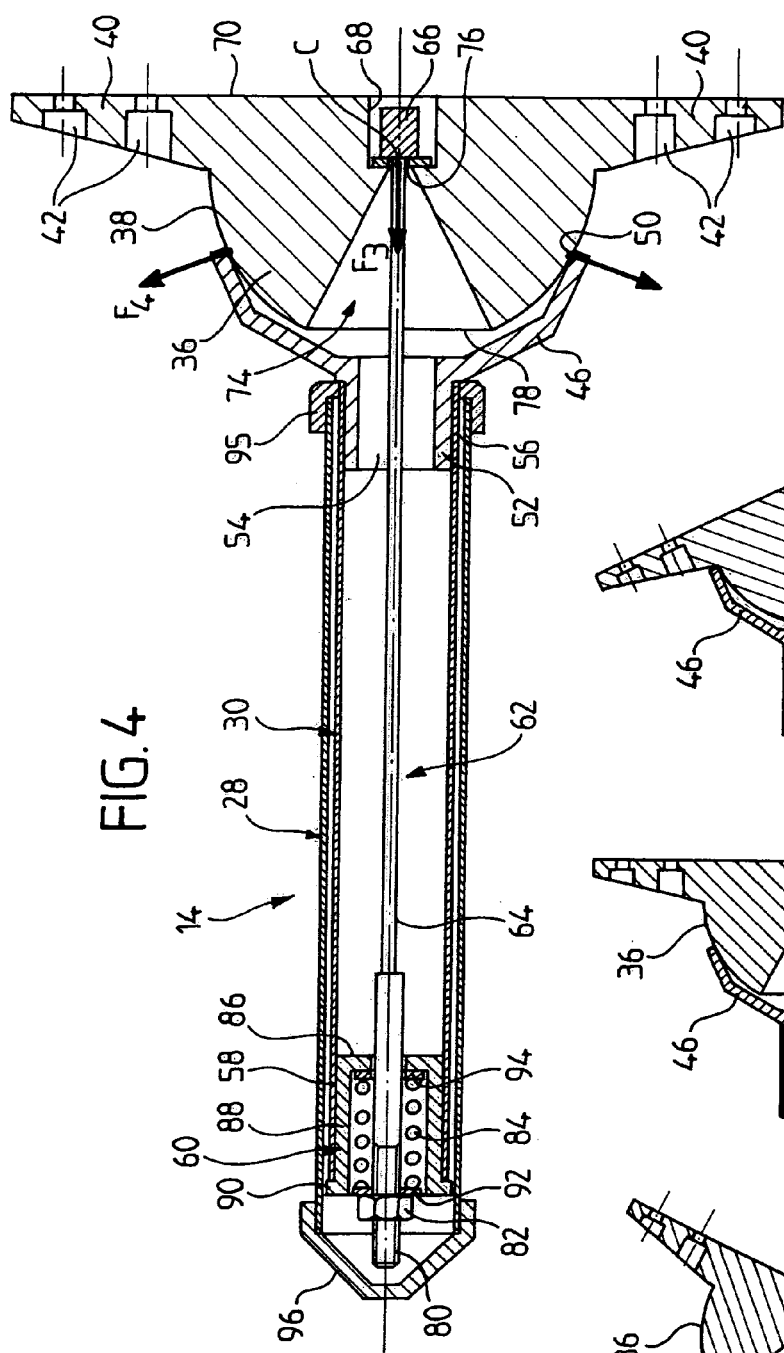
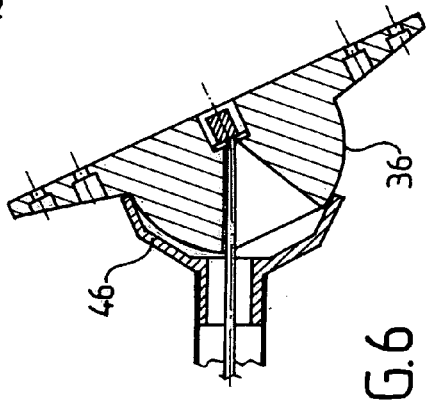
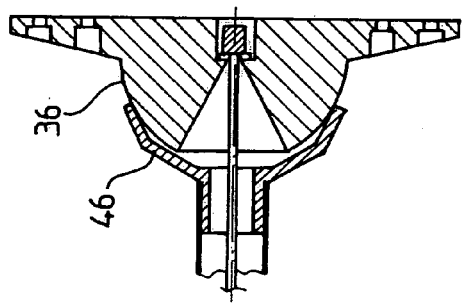
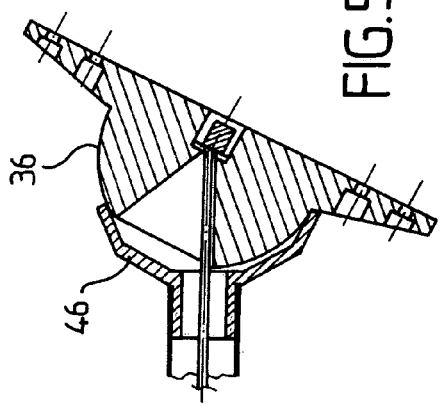

SUPPORT DEVICE FOR A LIQUID CRYSTAL FLAT SCREEN

The invention relates to office equipment, in particular computer equipment.

More particularly it relates to a support device for a liquid crystal flat screen, in particular for computer workstations.

It is known that liquid crystal flat screens are used more and more in computer workstations, in particular those intended for banking establishments, trading rooms and the like.

In fact, owing to their small space requirement and the visual convenience with which they provide the user, these flat screens advantageously replace the traditional cathode ray tube screens.

Support devices for liquid crystal flat screens are already known comprising an arm, and an articulating mechanism interposed between the arm and the screen.

In the known devices of this type, the arm is generally connected to a carrying structure and is generally composed of a plurality of elements articulated to one another. This arm made of a plurality of elements is often bulky and requires the use of a strong carrying structure which also takes up space on the workstation where it is placed.

The articulating mechanism is intended to provide a multi-directional or universal articulation to provide a multitude of possibilities for adjusting the flat screen.

In the known devices of this type, the articulating mechanism generally belongs to two main types.

In a first type, the articulating mechanism is composed of successive articulating members with a single axis of articulation, mounted such that their respective axes of articulation are mutually offset.

In a second type, the mechanism comprises a spherical portion kept sandwiches between two rings elastically biased toward each other.

These known articulating mechanisms are often complex and costly to produce. Moreover, they have to be adapted each time to the type of flat screen to be supported, in particular to take account of the weight thereof. Finally, they are generally bulky, difficult to adjust and therefore incompatible with liquid crystal flat screens.

The object of the invention is in particular to overcome the above-mentioned drawbacks.

It primarily aims to provide a support device for a liquid crystal flat screen which has an articulating mechanism with a simple structure which is robust and not very bulky, that can be produced easily and at low cost.

The invention also aims to provide a support device of this type of which the articulating mechanism allows simple adjustment of the flat screen in a multiplicity of possible positions, and without the flat screen then being able to lose its adjusted position, despite the restoring moment exerted by the flat screen.

It also aims to provide a support device of this type which is compatible with a wide range of liquid crystal flat screens.

For this purpose, the invention proposes a support device of the type defined at the outset, in which the artculating mechanis comprises a ball portion having a general hemisphecical surface and adapted to be fixed to the screen, a cage defining a housing for receiving the bal portion and having an annular edge which makes frictional contact with the ball portion, a tie rod interposed between the case and the ball portion, while resting substantially at the center of the ball portion, to exert an elastic restoring force of a selected value which causes the ball portion to rest against the annular edge of the case, and a tie rod passage consisting of a widened recess produced in the ball portion and opening on the hemispherical surface of the ball to allow clearance of the tie rod in the ball portion, whatever the position of the ball portion with respect to the cage.

Thus, in contrast to the conventional articulating mechanisms where the ball is a sphere sandwiched between two rings biased toward one another, the ball portion of the invention substantially has the form of a half-sphere and is received in a cage having an annular edge against which the ball portion has friction contact.

The tie rod interposed between the cage and the ball portion exerts an elastic restoring force which acts substantially on the center of the ball portion and extends along an axis passing substantially through the center of the ball portion.

As the tie rod passes through a widened passage, the distance between its two attachment points remains constant and the traction force remains constant whatever the position of the ball with respect to the cage.

The ball portion is thus axially biased to rest against the annular edge of the cage, in other words against a limited surface and this accordingly increases the force and the contact pressure. A gripping force is thus obtained which acts substantially along the axis.

Moreover, the ball portion of general hemispherical form of the invention may have a diameter which is larger than that of the conventional ball of spherical form.

The ball portion therefore provides a multi-directional or universal articulation and, once adjusted in position, there is no risk of it being displaced relative to the cage, despite the restoring moment exerted by the flat screen which is mounted in cantilever fashion.

According to a further characteristic of the invention, the ball and the cage are each formed from a material with high mechanical strength and a high coefficient of friction.

In a preferred embodiment, the ball portion and the cage are each formed from a plastic material of the polycarbonate type. It may also be easily produced by injection molding.

The tie rod passes through the ball portion and the cage and comprises a first end stop resting substantially at the center of the ball portion and a second end stop resting on the outside of the cage.

According to a further characteristic of the invention the ball portion comprises a housing serving to receive the first end stop which opens onto a rear face of the ball portion and which communicates with the tie rod passage.

The tie rod passage preferably has a generally conical form with a narrow aperture communicating with the stop housing and a wide aperture opening on the hemispherical surface of the ball portion.

This allows a large range of movement of the ball portion with respect to the cage.

According to a further characteristic of the invention the second end of the tie rod comprises a threaded portion provided with an adjusting nut and passing through a spring which rests against a support ring disposed on the exterior of the cage.

Advantageously the tie rod comprises a flexible cable, preferably a multi-strand metal cable.

The ball portion advantageously comprises radial lugs for fixing it on the rear face of a flat screen.

According to a further characteristic of the invention, the arm comprises a hollow tube forming an axial passage for the tie rod and having a first end attached to a sleeve coming from the cage and a second end carrying a support for the traction means.

In the description which follows, given only by way of example, reference is made to the accompanying drawings, in which:

FIG. 2 is a sectional view, viewed in the axis of the arm in the shape of a tube, of the device of FIG. 1;

FIG. 3 is a front view of the stirrup, which is a part of the carrying structure;

FIG. 4 is a sectional view of the device, the tube being shown in the telescoped position;

FIGS. 5 to 7 are part sectional views similar to FIG. 2 showing three different positions of the ball;

Figure 1:
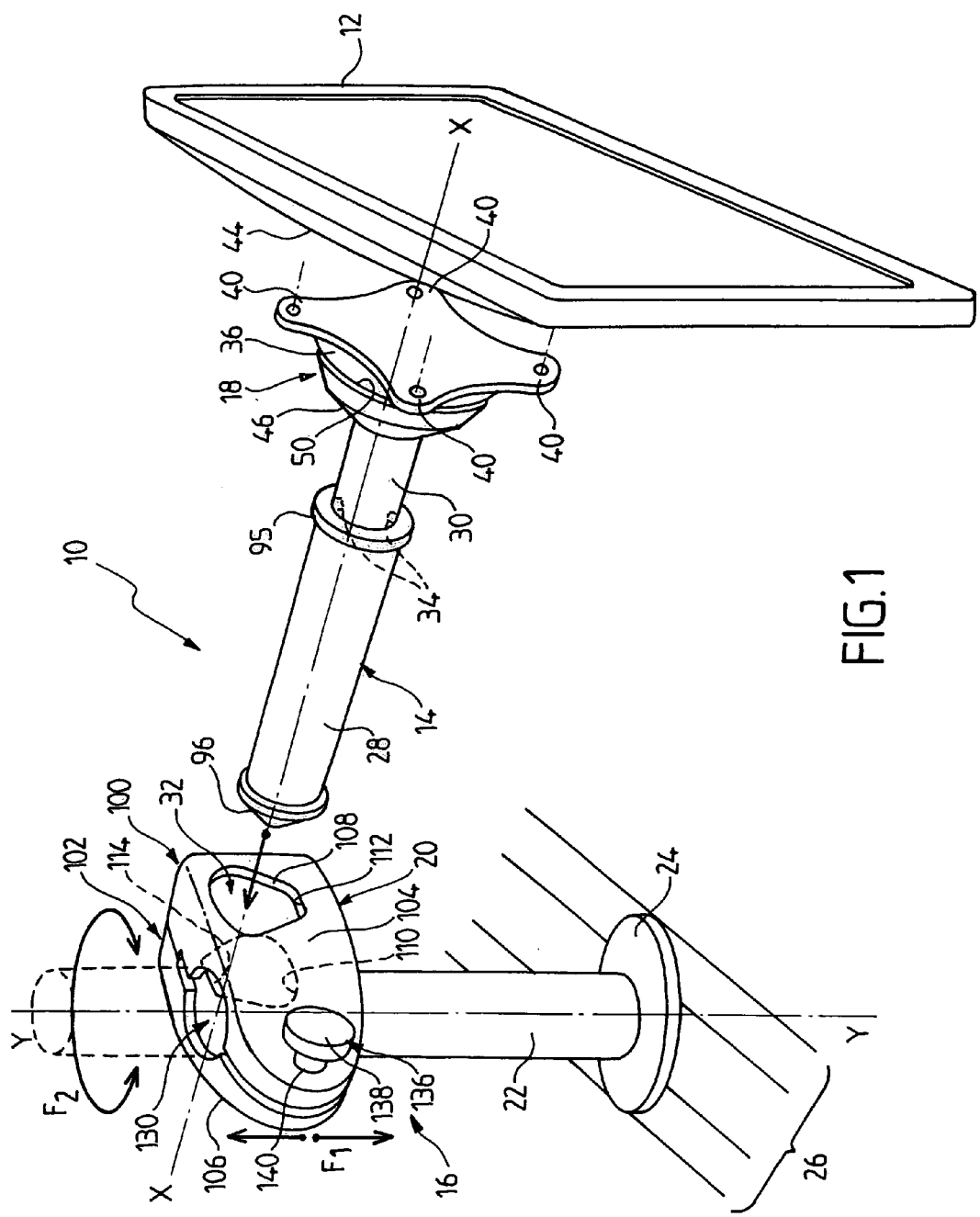
FIG. 1 is a perspective view of a support device for a liquid crystal flat screen according to the invention.

Reference is firstly made to FIG. 1 which shows a device 10 intended to support a flat screen 12 of the liquid crystal type such as those used, for example in computer workstations.

The device 10 comprises an arm 14, forming a bracket, disposed in a position which is substantially horizontal being supported by a carrying structure 16. An articulating mechanism 18 is interposed between the arm 14 and the screen 12.

The carrying structure 16 comprises a stirrup 20, also called a shoe, which can slide vertically (double arrow F1) along a vertical pole 22 produced here in the form of a tube with a circular cylindrical wall. The pole 22 comprises a footing 24 adapted to being fixed, preferably in an adjustable manner, on a workstation, for example a computer desk.

In the example, the position of the footing 24 can be adjusted along a horizontal rail 26 (shown schematically) provided on said computer workstation.

The arm 14 is produced here in the form of a telescopic tube which comprises a first tubular portion 28, in the example with a circular cylindrical form, and a second tubular portion 30, also of a circular cylindrical form, capable of sliding inside the tubular portion 28.

The tubular portion 28 is adapted to slide axially and rotate freely in a horizontal passage 32 of the axis XX defined by the stirrup 20. Thus, the tubular portion 28 can be adjusted in a given axial and angular position with respect to the stirrup 20. The stirrup is also adjustable in a given angular position with respect to the pole 22 as shown by the arrow F2.

In addition, the tubular portion 30 can be axially adjusted with respect to the portion 28 which allows the distance between the screen 12 and the stirrup to be modified in a large range taking into account the telescopic character of the arm 14.

Preferably the tubular portions 28 and 30 comprise mutual rotational locking means to prevent the tubular portion 30 from rotating with respect to the tubular portion 28 under the action of a torque produced by the screen 12 when it is in an inclined cantilever position.

These mutual locking means are advantageously of the groove type, shown schematically at 34 in FIG. 1.

The articulating mechanism 18 will now be described with particular reference to FIGS. 2 and 4. In FIG. 2, the arm 14 (telescopic tube) is shown in the opened-out position, while in FIG. 4 this arm is shown in the retracted position.

The articulating mechanism 18 comprises a ball portion 36 which has a hemispherical surface 38 with a center C (FIG. 4). The ball portion 36 is extended by four radial lugs 40 which can better be seen in FIG. 1. These four lugs are disposed at 90° to one another and each comprise two bores 42 to allow the ball portion 36 to be fixed on a rear face 44 of the screen. Said face is provided with four appropriate bores (not shown) to the VESA standard. The existence of two bores 42 on each of the lugs 40 allows the ball portion to be adpated to screens of the different sizes.

The ball portion 36 itself is received in an internal housing 48 defined by the cage 46. However, the interior surface of the cage does not constitute a surface equivalent to the hemispherical surface 38. On the contrary, the cage only comes into contact with the hemispherical surface 38 by an internal annular edge 50 which thus forms an annular and narrow contact surface. The cage 46 is extended by a sleeve 52 which defines an axial cylindrical passage 54.

The tubular portion 30 of the arm 14 comprises a first end 56 which adapts around the sleeve 52 and a second end 58 which receives on the interior a support 60, of which the structure will be described hereinafter.

The ball portion 36, and the cage 46 are each formed from a material with high mechanical strength and a high coefficient of friction. In this respect it is advantageous for the ball portion 36 and the cage to each be formed from an appropriate plastics material, and in particular of the polycarbonate type. The ball portion 36 and the cage 46 can thus be easily produced by injection molding of this particular plastics material.

According to the invention, the device also comprises traction means 62 interposed between the cage and the ball portion 36 to exert a elastic restoring force of a selected value which causes the ball portion 36 to rest against the annular edge 50 of the cage. Owing to and taking into account the high coefficient of friction of the material used, the ball portion 36 and the cage are elastically biased against one another and this allows the ball portion 36 to be jrnmobilised, in a selected orientation, with respect to the cage.

In the embodiment shown, the traction means 62 comprise a tie rod 64 which, in the example, is a flexible cable, in particular a multi-strand metal cable. This tie rod 64 passes through the ball and the cage and comprises a first end stop 66, here of general circular cylindrical form, which rests substantially at the center C of the ball portion 36. For this purpose, the ball portion 36 comprises a cylindrical housing 68 serving to receive the stop 66 and opening on a rear face 70 of the ball portion 36. This housing 68 communicates with a frustoconical passage 74 which is used for the passage of the tie rod and opens onto the hemispherical surface 38 of the ball portion 36. This passage 74 has a general conical form and comprises a narrow aperture 76 which communicates with the housing of the stop 68 and a wide aperture 78 of circular form which opens onto the hemispherical surface of the ball portion 36.

The tie rod 64 comprises a second end stop 80 which is received in the support 60 outside the cage. For this purpose, the end of the tie rod is produced in the form of a threaded portion equipped with an adjusting nut 48 and passed through by a helical spring 84 which rests against a support ring 86 which is part of the support 60.

More particularly, this support 60 comprises a sleeve 88 terminated by a collar 90 and of which the base consists of the above-mentioned support ring 86. The spring 84 is disposed between two washers: one washer 92 situated against the nut 82 and one washer 94 situated against the support ring 86.

It will be understood that the axial force F3 which is exerted on the ball and therefore the lateral force F4 exerted against the annular edge 50 can be adjusted (FIG. 4). This adjustment is obtained by judicious selection of the stiffness spring and by appropriate adjustment of the axial position of the nut 82.

The combination of this adjustment and the selection of the materials constituting the ball portion 36 and the cage allow considerable friction to be produced between the ball and the cage and this allows the ball to be immobilised in a selected orientation and this orientation to be maintained despite the weight exerted by the screen 12.

It will be noted that the tubular portion 28 of the arm is terminated, on one side, by a ring 95 which slides inside the tubular portion 30 and, on the other side, by a cap 96 of conical shape. This cap hides the access to the adjusting nut and also constitutes a stop preventing the arm 14 from escaping the stirrup 20.

As can be seen in FIGS. 5 to 7, the ball portion 36 (therefore the screen 12) may adopt an infinity of orientations. In any case, the traction force exerted on the ball portion 36 is applied substantially to the center thereof and in the axis of the arm. Taking into account the frustoconical form of the tie rod passage 74 the ball portion 36 may have a large range of movement. This allows an infinity of adjusting positions or orientations, in combination with the fact that the arm 14 is itself telescopic and that it is carried by a stirrup which is adjustable with respect to height and orientation with respect to the pole 22.

The structure of the stirrup 20 will now be described with particular reference to FIGS. 1 to 3 and 8 and 9.

The stirrup 20 comprises two portions or shells 100 and 102 which are generally similar, arranged on either side of the pole 22 and joined together, the portion 100 being situated on the side facing the screen 12 and the portion 102 on the opposite side.

The shells 100 and 102 have respective walls 104 and 106 spaced horizontally and equipped respectively with two aligned apertures 108 and 110 which define the above-mentioned horizontal passage 32 of the axis XX.

Figure 8:
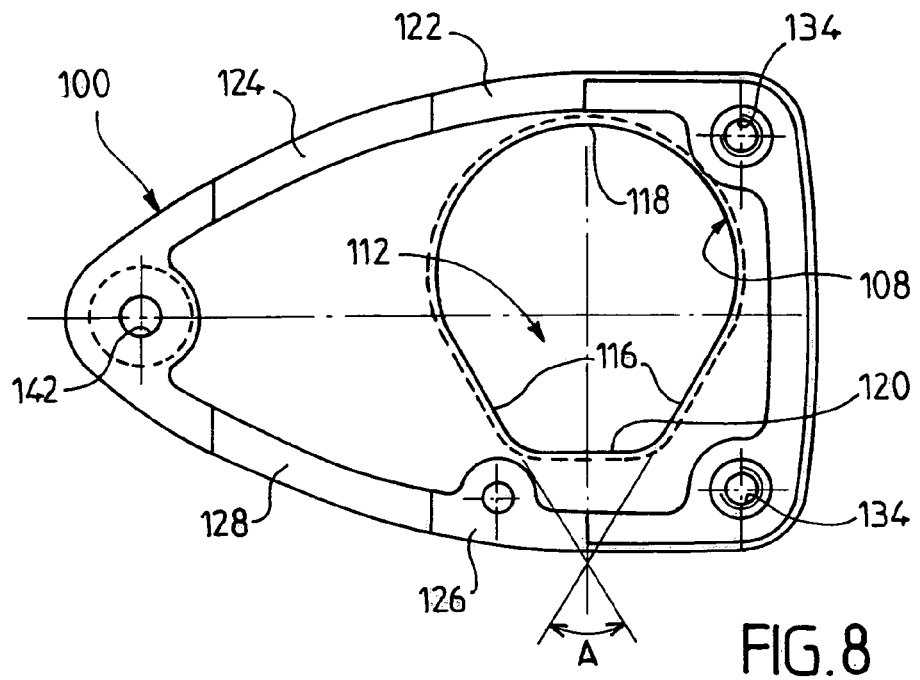
FIG. 8 is a front view of a shell which is part of the stirrup of the device of the invention.
Figure 9:
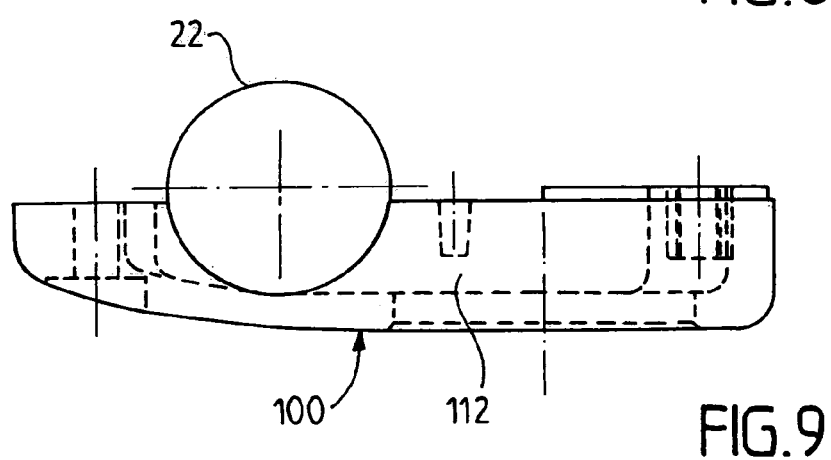
FIG. 9 is a plan view corresponding to FIG. 8.

The two apertures 108 and 110 each have a V-shaped end, in particular 112 and 114 respectively, these two ends being disposed head to tail. The end 112 of the aperture 108 is directed downwardly, while the end 114 of the aperture 110 is directed upwardly (see FIG. 1). Each of these ends, for example the end 112 is delimited by two straight edges 116 forming between them a selected angle A, typically between 50° and 70°, and 60° in the example (FIG. 8). These two straight edges 116 join at an edge 118 in an arc of a circle of which the diameter is slightly greater than the diameter of the tubular portion 28 of the arm.

The straight edges 116 of the aperture 108 do not form a real V to the extent that they are joined together at a transverse edge 120.

Thus, the tubular portion 28 of the arm can slide axially in the passage 32 and be immobilised in a given axial position and a given angular position. Moreover, the tubular portion 30 can be displaced simply by axial sliding, with respect to the tubular portion 28, to provide additional adjustment of the screen as already indicated.

The tubular portion 28 is thus locked in position with respect to the stirrup by the cooperation of the tubular wall of this portion 28 with the two V-shaped ends which are oriented head to tail.

In a simplified version it is possible to provide that only one of the two apertures comprises a V-shaped end. Each of the shells, for example the shell 100, comprises an upper folded edge 122 provided with an upper notch 124 in the shape of an arc of a circle adapted to face a similar upper notch of the other shell, and a lower folded edge 126 equipped with a lower notch 128 in the shape of an arc of a circle to face a similar lower notch of the other shell.

Thus, when the shells are disposed facing one another, the two facing upper notches and the two facing lower notches contribute to defining a vertical cylindrical passage 130 which admits an axis YY which is substantially orthogonal to the axis XX of the horizontal passage 32 (FIG. 1). This vertical passage is designed to be passed through by the vertical cylindrical pole 22 described above.

The shells 100 and 102 are generally similar and are advantageously produced by moulding of a metal material.

They are kept together by means of two screws 132 (FIG. 3) which pass through two circular apertures 134 of the shell 100 and cooperate with similar threaded passages of the shell 102.

The stirrup 20 also comprises a locking member 136 of the screw type for screwing the stirrup in a defined angular and axial position. This member 136 comprises a button 138 extended by a threaded rod 130 which passes through an aperture 142 of the shell 100 and cooperates with a threaded passage facing the shell 102. It should be noted that owing to the cantilever force exerted by the weight of the arm and of the screen, the stirrup 100 can be immobilised in an axial and angular position selected with respect to the pole 22, by the simple effect of wedging. The locking member 136 simply constitutes a safety device for locking the stirrup in a selected position relative to the pole.

Figure 10:
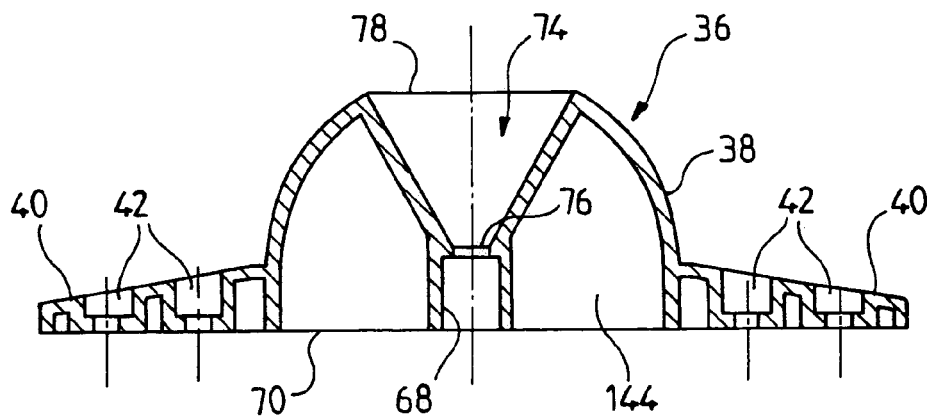
FIG. 10 is an axial sectional view of a ball portion in a different embodiment of the invention.

The ball 38 of FIG. 10 differs from that described above by the fact that it is hollowed instead of being solid. In fact it comprises a recess 144 which opens onto the rear face 70. This lightens the ball and facilitates its production by moulding without comprising its mechanical strength taking into account the material used.

A device of simple structure, which is not very bulky, allowing an infinity of possible adjustments to be made is thus obtained for a liquid crystal flat screen. The user easily adjusts the screen by the acting directly on the screen itself to bring it into the desired position.

The device can thus be easily installed on a workstation, in particular a computer desk.

The invention is not limited to the embodiments described above by way of example and numerous variations and possible. It will be understood in particular that the articulating mechanism can be used with different types of arms, produced in one or more parts.

The invention claimed is:

1. Support device for a liquid crystal flat screen, in particular for computer workstations, of the type comprising an arm and an articulating mechanism interposed between the arm and the screen, wherein the articulating mechanism comprises a ball portion having a general hemispherical shape and a center, and adapted to being fixed to the screen, a cage defining a housing for receiving the ball portion and having an annular edge which makes frictional contact with the ball portion, a tie rod interposed between the cage and the ball portion, while resting substantially at the center of the ball portion, to exert an elastic restoring force of a selected value which passes through said center and causes the ball portion to rest against the annular edge of the cage, and a tie rod passage formed of a widened recess produced in the ball portion and opening on the hemispherical surface of the ball portion to allow clearance of the tie rod in the ball portion, whatever the position of the ball portion with respect to the cage, wherein the tie rod passes through the ball portion and the cage and comprises a first end stop resting substantially in the center of the ball portion and a second end stop resting on the outside of the cage, and wherein the ball portion comprises a stop housing serving to receive the first stop which opens onto a rear face of the ball portion and which communicates with the tie rod passage, and wherein the tie rod passage has a generally conical shape and has a narrow aperture communicating with the stop housing and a wide aperture opening on the hemispherical surface of the ball portion.

2. Device according to claim 1, wherein the second tie rod stop comprises a threaded portion provided with an adjusting nut and passed through by a spring which rests against a support ring disposed on the outside of the cage.

3. Support device for a liquid crystal flat screen, in particular for computer workstations, of the type comprising an arm and an articulating mechanism interposed between the arm and the screen, wherein the articulating mechanism comprises a ball portion having a general hemispherical shape, and a center, and adapted to being fixed to the screen, a cage defining a housing for receiving the ball portion and having an annular edge which makes frictional contact with the ball portion, a tie rod interposed between the cage and the ball portion, while resting substantially at the center of the ball portion, to exert an elastic restoring force of a selected value which passes through said center and causes the ball portion to rest against the annular edge of the cage, and a tie rod passage formed of a widened recess produced in the ball portion and opening on the hemispherical surface of the ball portion to allow clearance of the tie rod in the ball portion, whatever the position of the ball portion with respect to the cage, wherein the arm comprises a hollow tube forming an axial passage for the tie rod and having a first end attached to a sleeve coming from the cage and a second end carrying a support for the tie rod.

4. A support device for a liquid crystal flat screen, comprising:

an arm having a first end, an articulating mechanism disposed at said first end, said articulating mechanism further comprises a ball portion having a substantially hemispherical shape for supporting said screen, a cage having a housing configured and dimensioned to operably receive said ball portion therein, said cage having an annular edge frictionally contacting said ball portion, said ball portion including a passage through a center of said ball portion, a tie rod interposed between said cage and said ball portion and extending through said center of said ball portion and resting on said center causing said ball portion to rest against said annular edge of said cage, wherein said ball portion and said cage are elastically biased against one another through said tie rod, and wherein said tie rod remains at a constant length and is free to move within said passage as said ball portion swivels relative to said cage.

5. Device according to claim 4, wherein the ball portion and the cage are each formed from a plastics material of the polycarbonate material.

6. Device according to claim 4, wherein the tie rod passes through the ball portion and the cage and comprises a first end stop resting substantially in the center of the ball portion and a second end stop resting on the outside of the cage, wherein a distance between said first end stop and said second end stop remains constant in any position where said ball portion is with respect to said cage.

7. Device according to claim 6, wherein the tie rod comprises a flexible cable.

8. Device according to claim 4, wherein the ball portion comprises radial lugs to fix it on a rear face of the flat screen.

9. Device according to claim 6, wherein the tie rod comprises a multi-strand metal cable.

* * * * *